(12) United States Patent
Melendez et al.

(10) Patent No.: US 6,813,446 B1
(45) Date of Patent: Nov. 2, 2004

(54) SYSTEM FOR ACQUIRING AND MAINTAINING RELIABLE OPTICAL WIRELESS LINKS

(75) Inventors: Jose L. Melendez, Plano, TX (US); Robert C. Keller, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 210 days.

(21) Appl. No.: 10/124,997

(22) Filed: Apr. 18, 2002

Related U.S. Application Data
(60) Provisional application No. 60/284,599, filed on Apr. 18, 2001.

(51) Int. Cl.[7] .............................................. H04B 10/00
(52) U.S. Cl. ...................... 398/131; 398/156; 398/162
(58) Field of Search ................................ 398/122, 123, 398/129, 131, 137, 138, 156, 162

(56) References Cited

U.S. PATENT DOCUMENTS 5,548,434 A * 8/1996 Shimonaka et al. ........ 398/162
5,822,099 A * 10/1998 Takamatsu .................. 398/162
6,285,481 B1 * 9/2001 Palmer ....................... 398/119
6,504,634 B1 * 1/2003 Chan et al. ................. 398/129

* cited by examiner

Primary Examiner—Leslie Pascal
Assistant Examiner—Dzung D. Tran
(74) Attorney, Agent, or Firm—William B. Kempler; W. James Brady, III; Frederick J. Telecky, Jr.

(57) ABSTRACT

Disclosed is apparatus and method for establishing and maintaining optical data transfer between a first optical communications device (202) and a second optical communications device (204). The devices have a feedback communications link (216) therebetween. An optical signal (214), having a predetermined signal profile (306), is transmitted from a transmission source (104) within the first optical communications device to an optical receiver (112) within the second optical communications device. The predetermined signal profile is transmitted from the first device, via the feedback communications link, to the second device. The signal profile (408) of the optical signal as received by the optical receiver is determined, and compared with the predetermined signal profile to quantify any misalignment or movement of the optical signal with respect to the optical receiver. The transmission of the optical signal is then adjusted by a directing member (106) responsive to the results of the compared profiles to align and center the optical signal with respect to the optical receiver. Once properly align, the optical signal may be utilized for high speed, high bandwidth data transmission.

20 Claims, 2 Drawing Sheets

SYSTEM FOR ACQUIRING AND MAINTAINING RELIABLE OPTICAL WIRELESS LINKS

This amendment claims priority under 35 USC § 119(e)(1) of provisional application No. 60/284,599 filed Apr. 18, 2001.

FIELD OF THE INVENTION

The present invention relates in general to optical wireless communications and, more particularly, to apparatus and methods for establishing and maintaining a reliable optical wireless data link between to transmitting and receiving units.

BACKGROUND OF THE INVENTION

Modern data communications technologies have greatly expanded the ability to communicate large amounts of data over many types of communications facilities. This explosion in communications capability not only permits the communication of large databases, but has also enabled the digital communication of audio and video content. This multimedia communication requires high bandwidth communication, which is now carried out over a variety of facilities, including telephone lines (e.g., fiber optic and twisted pair), coaxial cable (e.g., as supported by cable television service providers), dedicated network cabling within an office or home location, satellite links, and wireless telephony.

Each of these conventional communications facilities involves certain limitations in their deployment. In the case of communications over the telephone network, high-speed data transmission, such as that provided by digital subscriber line (DSL) services, must be carried out at a specific frequency range to not interfere with voice traffic, and is currently limited in the distance that such high-frequency communications can travel. Of course, communications over "wired" networks, including the telephone network, cable network or dedicated network, requires the running of the physical wires among the locations to be served. This physical installation and maintenance is costly, as well as limiting to the user of the communications network.

Wireless communication facilities of course overcome the limitation of physical wires and cabling, and provide great flexibility to the user. Conventional wireless technologies involve their own limitations, however. For example, in the case of wireless telephony, the frequencies at which communications may be carried out are regulated and controlled. Furthermore, current wireless telephone communication of large data blocks, such as video, is prohibitively expensive, considering the per-unit-time charges for wireless services. Additionally, wireless telephone communications are subject to interference among the various users within a nearby area. Radio frequency data communication must be carried out within specified frequencies, and is also vulnerable to interference from other transmissions. Satellite transmission is also currently expensive, particularly for bidirectional communications (i.e., beyond the passive reception of television programming).

Recently, attention has turned to optical wireless networking for data communications. Using this technology, data is transmitted by modulating a light beam, in much the same manner as in the case of fiber optic telephone communications. A photo-receiver receives the modulated light, and demodulates the signal to retrieve the data. As opposed to fiber optic-based optical communications, however, this approach does not use a physical wire for transmission of the light signal. In the case of directed optical communications, a line-of-sight relationship between the transmitter and the receiver permits a modulated light beam, such as that produced by a laser, to travel without the waveguide of a fiber optic cable.

Hence, optical wireless networks could provide numerous important advantages over other conventional communications systems. First, high frequency light modulation can provide for high bandwidth data communication (e.g., ~100 Mbps—Gbps). This high bandwidth need not be shared among multiple users, especially when carried out over line-of-sight optical communications between transmitters and receivers. Without other users on the communications link, of course, the bandwidth is not limited by interference from other users, as in the case of wireless telephony. Modulation can also be quite simple, as compared with multiple-user communications that require time or code multiplexing of multiple communications signals. Bi-directional communication can also be readily implemented utilizing this technology. Furthermore, optical frequencies are not currently regulated, and as such no licensing is required for the deployment of extra-premises networks.

These attributes of optical wireless networks make this technology attractive both for local networks within a building, and also for external networks. Indeed, it is contemplated that optical wireless communications may be useful in data communication within a room, such as for communicating video signals from a computer to a display device, such as a video projector. The costs and effort associated with routing and placing cables in congested, space constrained areas can be eliminated using optical wireless links. If reliable enough, modems using optical wireless links would be especially valuable in mobile product devices such as laptop computers and handheld organizers.

A common problem with some conventional optical wireless links, however, is that they utilize relatively wide, diffuse optical beams to facilitate the acquisition and maintenance of a light link. The ability to correctly aim a transmitted light beam at a receiver is of importance in optical communications technology. Wider beams can allow for greater tracking tolerance, because exact positioning of a transmitting beam on a receiver is not required to maintain a nominal communication link. The use of wider beams, however, either decreases the intensity (i.e., power) of the beam at the receiver or increases the power required to deliver a high data rate signal, and can result in severe limitations in the usable bandwidth of the data link(s) established, thus decreasing the usefulness of link for many communication applications.

Some conventional systems attempt to use narrower, more tightly focused optical beams (e.g., laser generated collimated beams) to provide greater communications bandwidth. When utilizing laser-generated collimated beams, which can have quite small spot sizes, the reliability and signal-to-noise ratio of the transmitted signal are degraded if the aim of the transmitting beam strays from an optimum point at the receiver. Considering that many contemplated applications of this technology are in connection with equipment that will not be precisely located, or that may move over time, it is necessary to be able to rapidly and reliably adjust the aim of the light beam.

Because the integrity of communications does rely on precise optical alignment, conventional solutions can also present problems in circumstances where transceiver units are subject to some vibration or sway (e.g., a building to building link, or a mobile to stationary link). Many conventional systems rely on a low bandwidth direct feedback channel between transceivers, such as a secondary telephone line modem, and some gross mechanical adjustment (e.g., a motorized mechanical assembly housing one or more of the transceivers) to maintain transceiver alignment. Such conventional systems can have problems responding when high frequency vibrations occur, and make it difficult, if not impossible, to successfully track and maintain communications with a moving transceiver. Finally, such conventional systems are often not able to translate changes in signal strength, which is a common method of measuring the integrity of a communications link, into usable positioning information for the mechanical assembly.

Thus, when either a high degree of transceiver mobility is required, or when transceivers may be subject to high frequency or small scale vibrations, conventional systems are typically incapable of providing reliable, high bandwidth communication.

SUMMARY OF THE INVENTION

Therefore, a versatile system for acquiring and maintaining reliable optical wireless links that provides for simple and cost-effective high performance optical communications, especially where fixed optical units are subject to high frequency vibrations or where optical units are in motion relative to one another, is now needed, providing for efficient and practical utilization of optical wireless communications in mobile products and devices while overcoming the aforementioned limitations of conventional methods.

The present invention provides a system for implementing an optical communications network. The present invention determines optical beam position information with respect to time at a receiver of an optical wireless link unit. The optical beam is transmitted from a second optical wireless link unit in response to a predetermined beam steering input. The relative motion of the units in relation to one another, and with respect to time, will result yield beam position profiles over time. A beam steering element effectively separates the motion into two components. The first component corresponds directly to the beam steering input, which is predetermined. The second component corresponds to the relative motion, which can be of variable frequency or amplitude. A high bandwidth return channel is provided to relay a high resolution portrait of the beam location profile over time. The present invention processes and utilizes this information to adjust the beam steering element, correcting for the motion or vibrations and maintaining the optical data link between the units. The present invention thus provides robust and efficient optical wireless communications within a given fixed or mobile network or system.

BRIEF DESCRIPTION OF THE DRAWINGS

For a more complete understanding of the present invention, including its features and advantages, reference is made to the following detailed description, taken in conjunction with the accompanying drawings. Corresponding numerals and symbols in the different figures refer to corresponding parts unless otherwise indicated.

DETAILED DESCRIPTION

The present invention defines a system, comprising various structures and methods, implementing an optical communications network. The present invention determines optical beam position information with respect to time at a receiver of an optical wireless link unit. The optical beam is transmitted from a second optical wireless link unit in response to a predetermined beam steering input. The relative motion of the units in relation to one another and with respect to time, will result yield beam position profiles over time. A beam steering element effectively separates the motion into two components. The first component corresponds directly to the beam steering input, which is predetermined. The second component corresponds to the relative motion, which can be of variable frequency or amplitude. A high bandwidth return channel is provided to relay a high resolution portrait of the beam location profile over time. This information is processed and utilized by the present invention to adjust the beam steering element, correcting for the motion or vibrations and maintaining the optical data link between the units. The present invention provides robust and efficient optical wireless communications within a given fixed or mobile network or system.

It should be understood that the principles and applications disclosed herein can be applied to a wide range of optical communications systems utilizing a variety of optical transmission and reception technologies. For purposes of explanation and illustration, the present invention is hereafter described in reference to several specific embodiments of high performance optical communication systems. The present invention, however, is equally applicable in any number of communication networks that might enjoy the benefits and advantages provided by the present invention.

Figure 1:
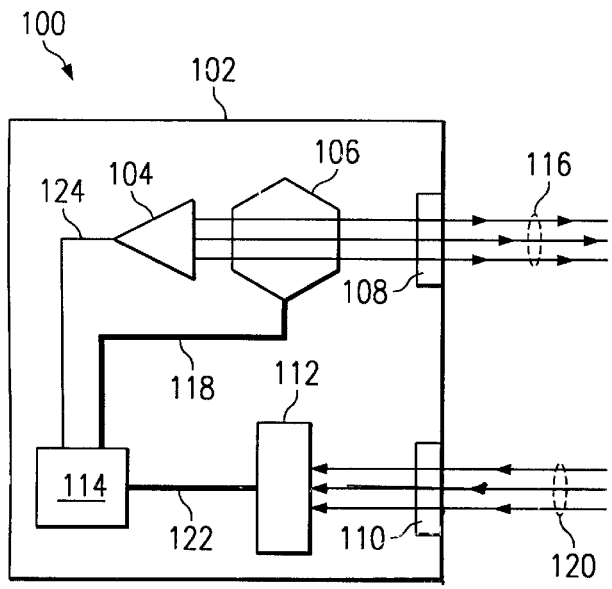
FIG. 1 illustrates an optical transceiver in accordance with the present invention.

The present invention is now described beginning in reference to FIG. 1, which illustrates an optical transceiver 100 according to the present invention. Transceiver 100 comprises a housing 102, light source 104 disposed within housing 102, beam directing member 106 disposed within housing 102, transmit aperture 108, receive aperture 110, optical detector 112 disposed within housing 102, and a processor member 114. Housing 102 may comprise any application appropriate structure that will house the necessary elements, such as a molded plastic enclosure or even a semiconductor substrate. Source 104 may comprise a number of appropriate devices and systems, but for purposes of explanation and illustration, will be depicted and treated as a collimated beam generating laser. Source 104 will operate responsive to processor 114, or some other processor means, to transmit high speed data communications via the light that it sources. Generally, member 106 will be interposed, either directly or indirectly, between source 104 and aperture 108 such that a transmitted light path 116 from source 104 is directed to member 106 and then out of housing 102 through aperture 108 to a receiving unit. Aperture 108 may comprise any desired structure, from a simple opening in housing 102 to any number of optical filters or lenses.

Beam directing member 106 is responsively coupled via link 118 to processor 114, and comprises an optical element or elements that provide the ability to manipulate and redirect light path 116 at very high speed and with very fine resolution. While there are a number of possible configurations and apparatus (e.g., series of optical lenses and filters) that would suffice, one embodiment of element 106 comprises an analog, 2-axis micro mirror. As those skilled in the art should be aware, such a micromirror provides for electromagnetic control responsive to processor 114, providing very fast light deflection in very fine increments. Other elements have similar responsiveness may be utilized according to the present invention.

Detector 112 may comprise any suitable photo detection device, or array of devices, disposed within housing 102 in proximity to aperture 110 to receive an incoming light path 120. Alternatively, detector 112 could be disposed directly within aperture 110 or directly upon an outer surface of housing 102. Detector 112 is coupled to processor 114 via link 122. Processor 114 may be disposed within, or as part of, housing 102, or alternatively, may be remotely located apart from housing 102. In the latter case, links 118 and 122 may comprise appropriate physical (e.g., wiring) or wireless (e.g., RF) signal paths between housing 102 and processor 114. Processor 114 may comprise any appropriate processor device (e.g., DSP) or processing capacity (e.g., personal computer) providing the ability to process data and algorithms in accordance with this invention. Finally, source 104 may be responsively coupled to processor 114 via link 124, or alternatively, may be activated responsive to some other desired external stimulus (e.g., another separate processor). In operation, source 104 initiates data communications via light path 116 responsive to some stimulus (e.g., a signal from processor 114). Light path 116 proceeds to member 106 where the direction of path 116 may be altered in varying degrees as it is directed onto and out of aperture 108 towards a desired target. Processor 114 can signal member 106 to alter, in varying degrees, the direction of path 116. Incoming light path 120 is received through aperture 110 by detector 112, and desired data is delivered to processor 114 via link 122.

Figure 2:
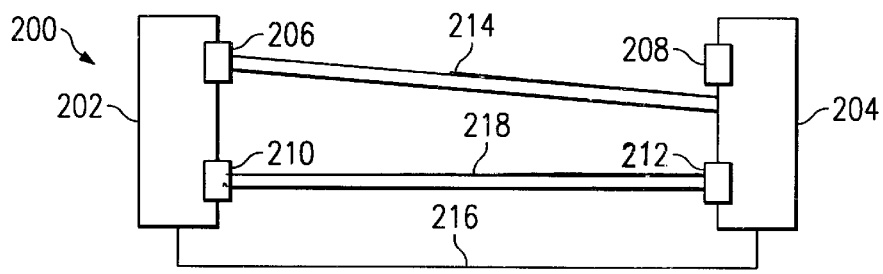
FIG. 2 illustrates one embodiment of an optical communications system in accordance with the present invention.

Referring now to FIG. 2, a simple communication system 200 according to the present invention is illustrated. System 200 comprises a first optical transceiver 202 and a second optical transceiver 204 of the type described in reference to FIG. 1. Although particular configuration may be varied depending upon system requirements, actual materials used, and desired performance, for ease of reference FIG. 2 depicts the transmit aperture 206 of transceiver 202 aligned with the receive aperture 208 of transceiver 204. Similarly, the receive aperture 210 of transceiver 202 is aligned with the transmit aperture 212 of transceiver 204. Generally, these initial alignments can be made manually to within a few degrees accuracy. Assuming that transceiver 202 is initiating communications, it will direct a transmit communications beam 214 at transceiver 204. System 200 will have a feedback path established between transceivers 202 and 204. This feedback path may take the form of a separate physical or wireless communications link 216 between the transceivers, or may comprise communication via a communications beam 218 from transceiver 204 to transceiver 202. In general, this feedback path will be used to communicate a variety of information between the transceivers to successfully target beam 214 and, once successfully targeted, to keep the high speed data transfer occurring through beam 214 locked on. A separate link 216 A may be used as a temporary feedback path only to initiate communications, at which point feedback operation may be switched to a direct optical link 218 between the two transceivers. Alternatively, a diffuse optical beam link between the two transceivers may be used as the initial feedback link, until the high speed direct optical communications can be established. A number of such possibilities, depending upon particular design and performance requirements, will be apparent upon reference to this specification to those skilled in the art.

The present invention communicates a variety of information between the optical communication units. Utilizing the present invention, a transmit beam 214 may be initiated with a known signal strength, and rastered in a predetermined pattern. This information is communicated to the receiving unit 204 via the feedback path. Unit 204 then compares, via the appropriate processor algorithms, the signal strength and profile as measured at its detector with the predetermined signal information. Any deviation or difference data is analyzed and communicated back, via the feedback path to transmitting unit 202, which may then use that data to adjust, via its beam directing member, the direction of beam. 214. This process is described in greater detail with reference now to FIGS. 3 and 4.

Figure 3A:
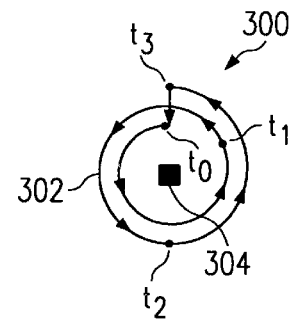
FIG. 3 illustrates one embodiment of a raster pattern in accordance with the present invention.
Figure 3B:
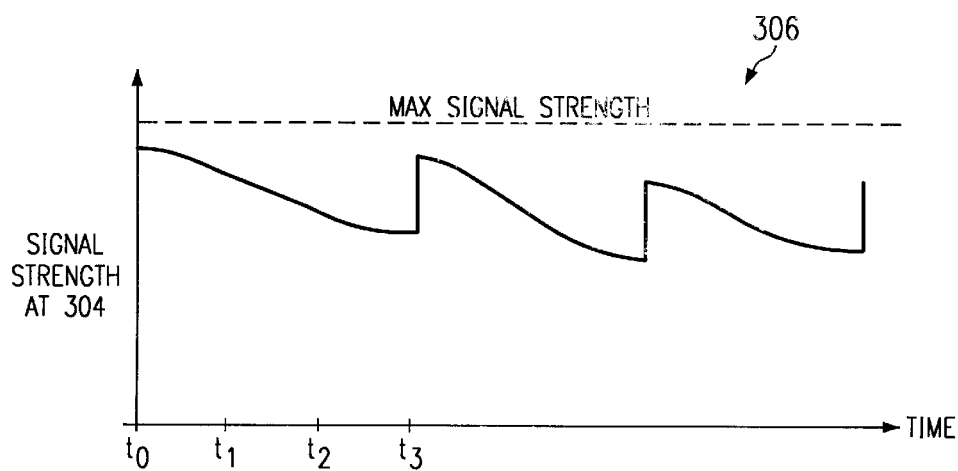
Figure 4A:
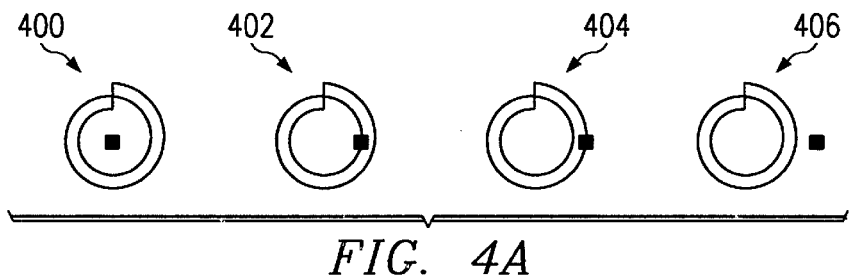
FIG. 4 illustrates the effects of raster movement according to the present invention.
Figure 4B:
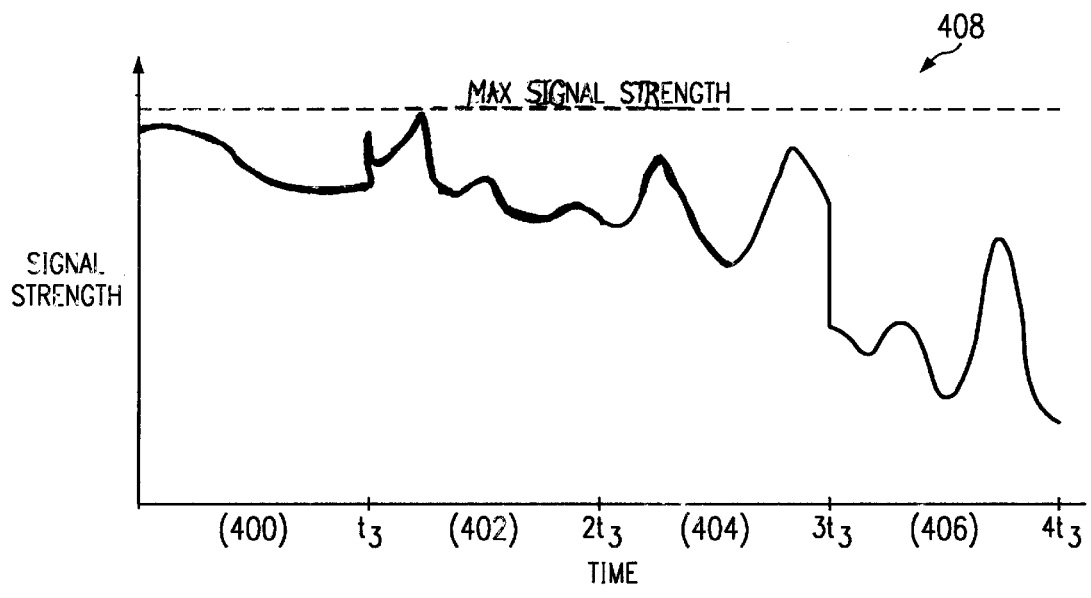

FIG. 3a depicts an illustrative raster pattern scheme 300. A transmitted light beam is traced in a pattern 302 around detector 304. Although not completely symmetrical, pattern 302 is effectively centered on detector 304. FIG. 3b depicts a plot 306 illustrating the characteristics of the signal received at detector 304 at various points $t_0$, $t_1$, $t_2$, and $t_3$ along pattern 302. Plot 306 provides a profile of specific signal intensity and duration data that can be algorithmically compared and analyzed to determine whether the raster pattern 302 is centered on detector 304 or not. FIG. 4 provides an illustration of effects on signal profile if the transmitted raster pattern is moved or moving off center. FIG. 4 depicts four instances 400, 402, 404, and 406 of raster pattern 302 as it is gradually moved off center to the side of detector 304. Plot 408 depicts the signal profile data as measured over four $t_3$ intervals corresponding to the four instances 400–406 of raster pattern 302.

As illustrated, plot 408 deviates measurably from the predetermined pattern in plot 306. The profile information for the transmitted beam raster pattern is communicated, via the feedback path, to the receiving unit. The processor of the receiving unit utilizes this information to determine any deviation in the raster pattern it actually receives at its detector. This deviation is analyzed, and associated with either the static variance from center, or movement away from center, of pattern 302. Once the variance or movement is analyzed, this information may be communicated back to the transmitting unit so that it makes appropriate adjustments, via its processor and beam steering member, to center the transmitted beam, effectively locking it on. This process is iterated continuously to maintain stable high speed optical communication between the two transceivers.

Figure 5:
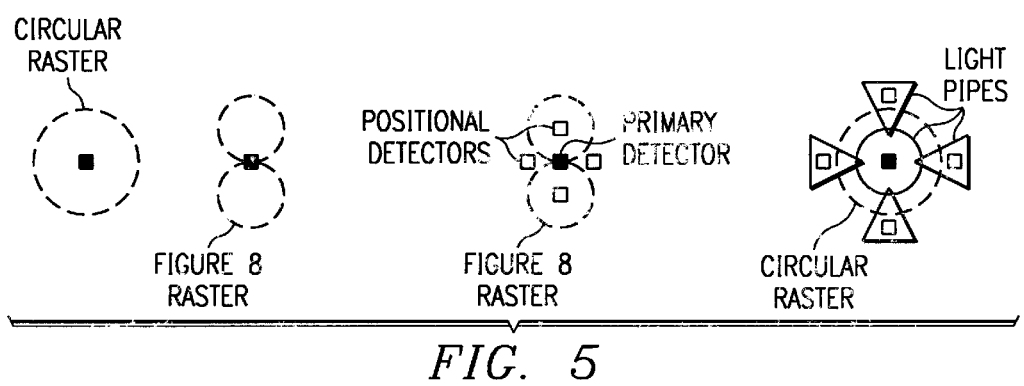
FIG. 5 illustrates a number of raster and detector configurations in accordance with the present invention.

As illustrated in FIG. 5, a large number of raster and detector array patterns are possible. Depending upon particular design and application constraints, raster patterns and detector configurations may be optimized. Symmetrical raster patterns, although useful, are not absolutely necessary; only patterns in which some variance in the regularity of the pattern and its resulting signal profile may be readily identified. As an alternative to, or in addition to, rastering the transmit beam, one embodiment includes a primary signal detector, which would be utilized for actual data communications, arrayed with a number of positional detectors, which would be utilized only to analyze the relative positional intensity of the transmitted beam. In this embodiment, the additional detectors provide a positional distribution, increasing accuracy of the signal profile and tracking process. Such an embodiment could detect relative movement faster (i.e., without completing an entire raster cycle), and thus increase the speed and efficiency of the tracking process. In addition, certain applications may incorporate the use of light pipes or other light directing devices to better analyze varying beam widths and intensities; enhancing detector responsiveness and profile characteristics. All such variations are comprehended by the present invention.

Thus, utilizing the present invention, designers can provide a high speed, high bandwidth communications utilizing optical wireless technology. Data communications will be reliable and cost effective, providing the ability to implement optical wireless technology in a number of applications where such technology was impossible or impractical to use.

While this invention has been described with reference to illustrative embodiments, this description is not intended to be construed in a limiting sense. Upon reference to the description, it will be apparent to persons skilled in the art that various modifications and combinations of the illustrative embodiments as well as other embodiments of the invention can be made without departing from the spirit and scope of the invention. It is therefore intended that the appended claims encompass any such modifications or embodiments.

What is claimed is:

1. A method of establishing optical data transfer between first and second optical communications devices, having a feedback communications link therebetween, comprising the steps of:

transmitting an optical signal, having a predetermined signal profile which includes specific signal intensity and duration data, from a transmission source within the first optical communications device to an optical receiver within the second optical communications device;

transmitting the predetermined signal profile from the first communications device, via the feedback communications link, to the second communications device;

determining a reception profile of the optical signal as received by the optical receiver;

comparing the reception profile to the predetermined signal profile to quantify misalignment of the optical signal with the optical receiver;

adjusting the transmission source responsive to the quantified misalignment to align the optical signal with optical receiver; and utilizing the optical signal to transmit data.

2. The method of claim 1 wherein the step of transmitting the predetermined signal profile comprises transmitting a signal on an independent optical link.

3. The method of claim 1 wherein the step of transmitting the predetermined signal profile comprises transmitting a signal on an independent telephone link.

4. The method of claim 1 wherein the step of transmitting the predetermined signal profile comprises transmitting a signal on an independent optical fiber link.

5. The method of claim 1 wherein the step of transmitting the predetermined signal profile comprises transmitting a signal on an independent wireless link.

6. The method of claim 1 wherein the signal profile is a spiral.

7. The method of claim 1 wherein the signal profile is circular.

8. The method of claim 1 wherein the signal profile has a FIG. 8 shape.

9. The method of claim 1 wherein the adjustment of the transmission source includes adjusting the orientation of a beam steering device.

10. The method of claim 9 wherein the beam steering device is a micromirror device.

11. Apparatus for establishing optical data transfer between first and second optical communications devices, having a feedback communications link therebetween, comprising:

an optical transmitter within the first optical communications device transmitting an optical signal, having a predetermined signal profile which includes specific signal intensity and duration data, to an optical receiver within the second optical communications device, the transmitter transmitting the predetermined signal profile from the first communications device, via the feedback communications link, to the second communications device;

a processor determining a reception profile of the optical signal as received by the optical receiver and comparing the reception profile to the predetermined signal profile to quantify misalignment of the optical signal with the optical receiver;

a beam directing member in the transmitter responsive to the quantified misalignment to align the optical signal with optical receiver.

12. Apparatus of claim 11 wherein the feedback communications link is an independent optical link.

13. Apparatus of claim 11 wherein the feedback communications link is an independent telephone link.

14. Apparatus of claim 11 wherein the feedback communications link is an independent optical fiber link.

15. Apparatus of claim 11 wherein the feedback communications link is an independent wireless link.

16. Apparatus of claim 11 wherein the signal profile is a spiral.

17. Apparatus of claim 11 wherein the signal profile is circular.

18. Apparatus of claim 11 wherein the signal profile has a FIG. 8 shape.

19. Apparatus of claim 11 wherein the beam steering device is a micromirror device.

20. Apparatus of claim 11 wherein the processor is a digital signal processor (DSP).

* * * * *